(12) United States Patent
Eschler et al.

(10) Patent No.: US 6,742,410 B1
(45) Date of Patent: Jun. 1, 2004

(54) OPERATING ELEMENT

(75) Inventors: Johannes Eschler, Ditzingen (DE); Juergen Schirmer, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 10/009,864

(22) PCT Filed: Jun. 3, 2000

(86) PCT No.: PCT/DE00/01813

§ 371 (c)(1),
(2), (4) Date: Apr. 12, 2002

(87) PCT Pub. No.: WO00/77603

PCT Pub. Date: Dec. 21, 2000

(30) Foreign Application Priority Data

Jun. 11, 1999 (DE) .......................... 199 26 596

(51) Int. Cl.⁷ ................................ G09G 3/02
(52) U.S. Cl. ................... 74/471 XY; 345/167; 345/157
(58) Field of Search ........................ 74/471 R, 479.09, 74/480 R, 491, 471 XY; 273/148 B, 148 R; 345/158, 161, 163, 164, 165, 166, 167; 463/36, 37, 46, 47

(56) References Cited

U.S. PATENT DOCUMENTS

| | | | | |
|---|---|---|---|---|
| 4,580,006 A | * | 4/1986 | Hull ...................... | 74/471 XY |
| 4,763,116 A | * | 8/1988 | Eichholz .................. | 345/157 |
| 4,933,670 A | * | 6/1990 | Wislocki .................. | 345/167 |
| 5,095,303 A | * | 3/1992 | Clark et al. .............. | 345/164 |
| 5,298,919 A | * | 3/1994 | Chang ..................... | 345/163 |
| 5,898,421 A | * | 4/1999 | Quinn ..................... | 345/158 |
| 6,215,473 B1 | * | 4/2001 | Suzuki .................... | 345/163 |

FOREIGN PATENT DOCUMENTS

| | | |
|---|---|---|
| DE | 84 19 546 | 10/1984 |
| DE | 35 03 667 | 8/1986 |
| WO | WO 97/25657 | 7/1997 |
| WO | WO 98/54670 | 12/1998 |

OTHER PUBLICATIONS

"Man–Machine Interface Device for 3–D Polar Coordinates" *IBM Technical Disclosure Bulletin*,US, IBM Corp., New York, vol. 32, No. 8A, 1990, pp. 407–408.

"Mouse Ball–Actuating Device with Force and Tactile Feedback" *IBM Technical Disclosure Bulletin*, US, IBM Corp., New York, vol. 32, No. 9B, Feb. 1, 1990, pp. 230–235.

"Interactive Trackball Relies on Force–Feedback Sensing" *Electronic Design*, US, Penton Publishing, Cleveland, Ohio, vol. 40, No. 9, May 1, 1992, pp. 32, 36.

* cited by examiner

Primary Examiner—David A. Bucci
Assistant Examiner—Bradley J. Van Pelt
(74) Attorney, Agent, or Firm—Kenyon & Kenyon

(57) ABSTRACT

An operating element having a first control element that is rotatable about a first axis, and having at least one second control element that is rotatable about a second axis and that does not coincide with the first axis. The operating element may include apparatuses, arrangements or structures to influence the torque required to rotate at least one of the control elements. An operating device having an operating element has a controller to influence the torque required to rotate at least one of the control elements as a function of the context. The operating element and the operating device permit a good haptic feedback and/or user guidance in adjusting a parameter or in scrolling through a menu, so that visual contact with the operating element or a pointer moved with the operating element in a menu is not necessary.

15 Claims, 4 Drawing Sheets

OPERATING ELEMENT

BACKGROUND INFORMATION

Figure 1:
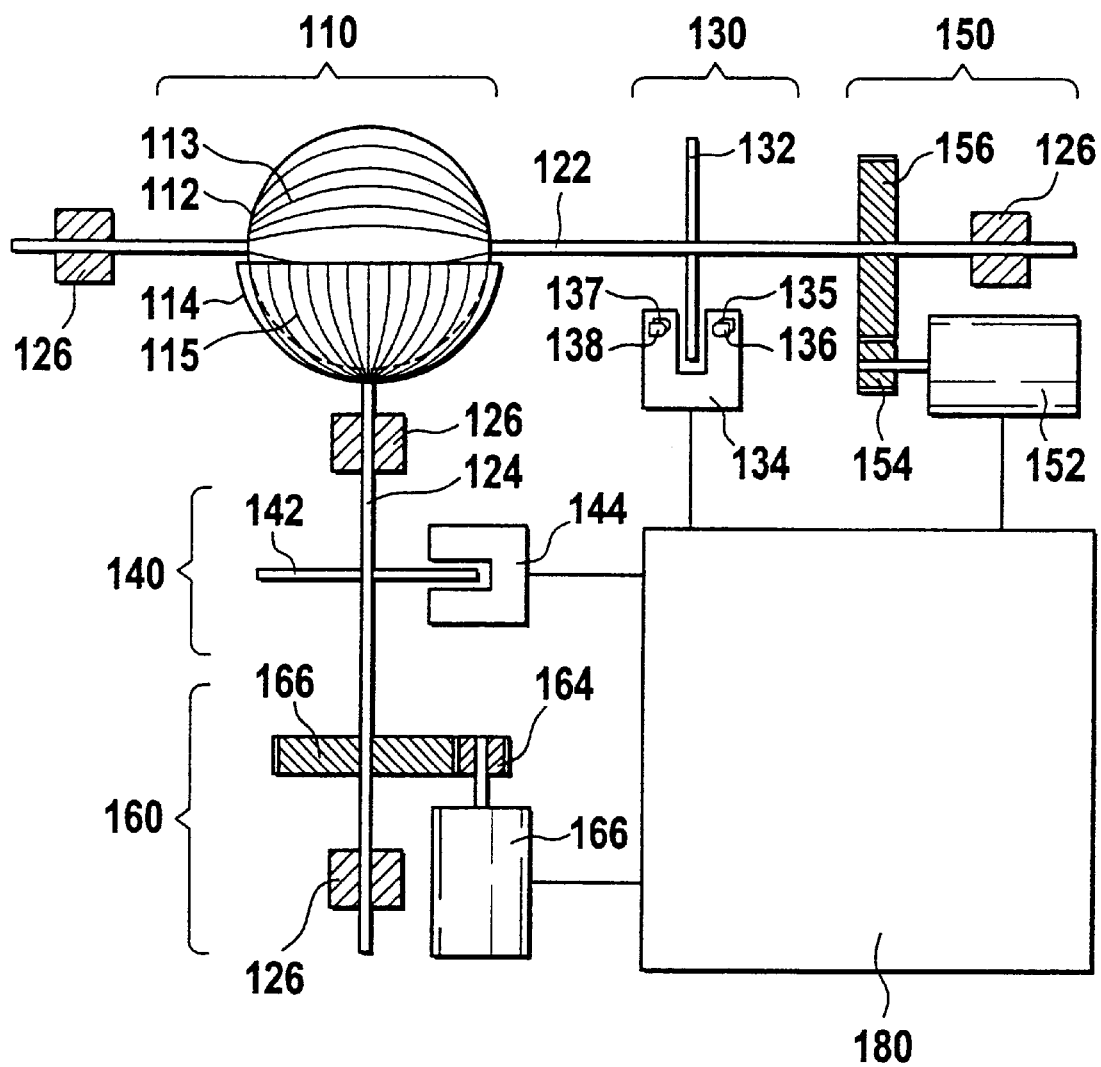

The present invention relates to an operating element according to the definition of the species of the independent patent claim.

For personal computers, operating devices are known which have a spherical operating element, e.g., in the form of a computer mouse or a trackball, the latter preferably in portable personal computers. These devices are mostly used for two-dimensional input, e.g., for controlling the position of a pointer within a two-dimensional menu displayed on a computer monitor screen. The spherical operating element in such a known operating device is usually supported so that any translatory movement of the ball within the casing surrounding it is essentially suppressed.

In addition, International Patent Application WO-A 98/54670 describes an operating device having a spherical operating element in the form of a lockable trackball, the spherical operating element described there having at its surface trough-like recesses in which the catch elements engage. For the user, this permits improved haptic feedback regarding the extent of adjustment of the parameter adjusted with the spherical operating element. Visual control of the parameter to be adjusted can thus be eliminated under some circumstances. The device described here is therefore especially suitable, for use in such devices in which visual control of the parameters to be adjusted is difficult or impossible.

Finally, one-dimensional operating elements, e.g., in the form of rotary potentiometers or rotary increment encoders, which can rotate about an axis of rotation and permit an adjustment of one parameter, are also known. Various parameters to be adjusted can be assigned to such an operating element, e.g., through function keys.

One-dimensional rotary encoders having a positional memory fixedly predetermined by a locating spring and corresponding locating marks constitute another known embodiment of such one-dimensional operating elements.

ADVANTAGES OF THE INVENTION

The operating element according to the present invention having the features of the independent patent claim, namely an operating element having a first control element that can rotate about a first axis, wherein at least one second control element can rotate about a second axis which does not coincide with the first axis, has the advantage that two parameters can be adjusted independently of one another by using a single operating element. This permits, for example, control of a pointer in a two-dimensional menu, whereby in contrast with a single spherical operating element as a two-dimensional operating element, inadvertent adjustment in an unwanted dimension, e.g., as a result of vibration or a faulty optical feedback, is prevented by having only one dimension assigned to each control element of the operating element.

An especially advantageous embodiment of the operating element according to the present invention is characterized by the fact that the second control element has a rotationally symmetrical design and the at least two control elements are arranged so that the second control element surrounds the first control element at least in part. This has the advantage that the user can locate the additional control element(s) without any complicated searching through a slight translatory movement of the hand operating the element, even without direct visual contact with the operating element, based on the knowledge of the location of a first control element of the operating element.

Structuring of the surface of at least one of the control elements is especially advantageous because on the one hand the grip of the respective control element can be increased in this way, while on the other hand the user can be given a haptically mediated impression of the possible rotational degrees of freedom of the respective control element.

It is also advantageous to provide means for influencing the torque required to rotate at least one of the control elements of the operating element. In this way, the user can be provided with haptic feedback of the prevailing value of the parameter to be adjusted e.g., in adjustment of a parameter by way of the operating element, or he can be notified that he has arrived at an end of a value range of the parameter to be adjusted.

The latter case, i.e., haptic mediation of an impression through the dimension of a parameter setting, is possible in particular if a torque characteristic is generated via the means for influencing the torque required for rotation of at least one control element, thereby achieving engagement of the control element.

It is also advantageous that the spacings of the locating marks are not fixed in the case of an operating element according to the present invention, in contrast with the mechanical option mentioned in the preamble, but instead they can be varied as a function of the context, for example. Thus, when the operating element according to the present invention is used as a volume controller for a car radio, for example, a large number of locating marks can be distributed over a revolution of the operating element, which makes it possible to cover the entire volume range with a single revolution with a sufficiently high resolution. On the other hand, when using the operating element as a source switch for a car radio, for example, only a few locating marks, each being assigned to one audio source, could be distributed over one revolution of the operating element, thus yielding the conventional haptics for home audio systems, for example, with which the user is familiar.

DRAWINGS

Embodiments of the present invention are illustrated in the figures and explained in greater detail below.

They show

Figure 1A:
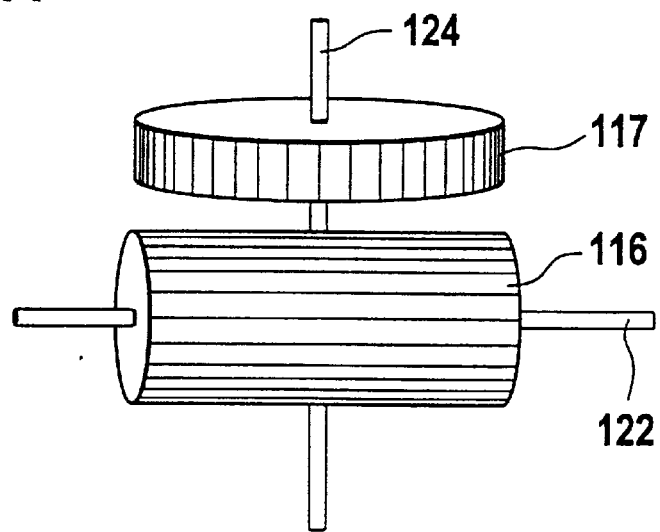
Figure 1B:
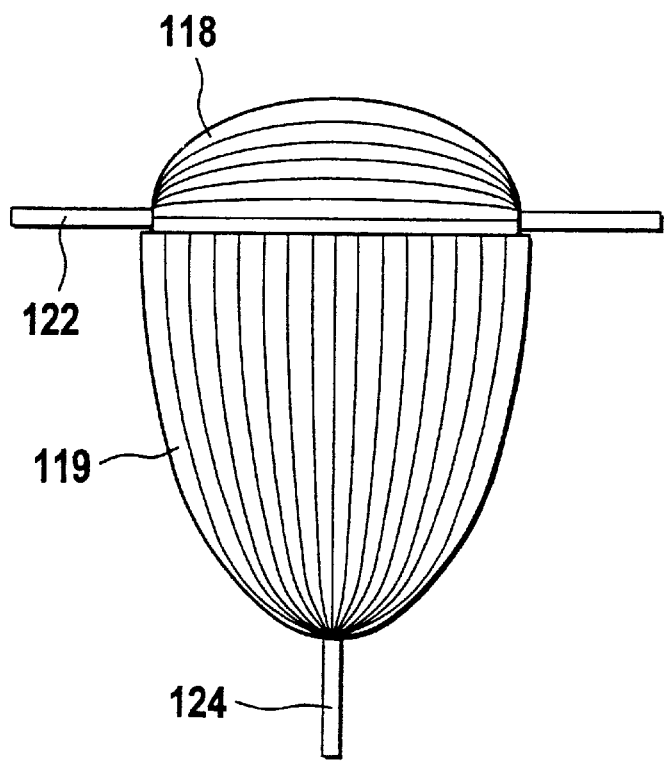
Figure 2A:
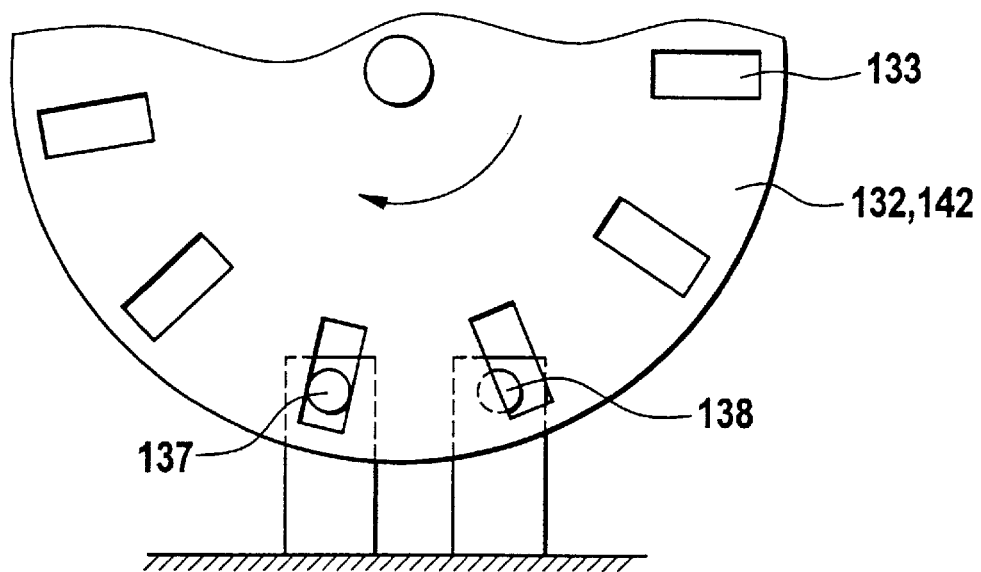
Figure 2B:
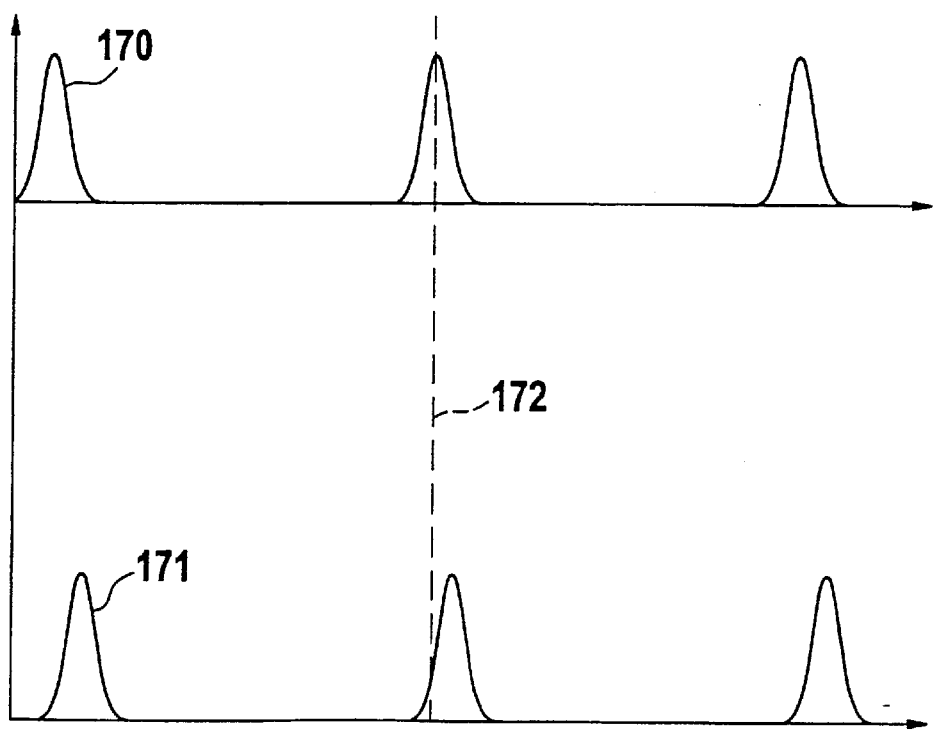
Figure 3:
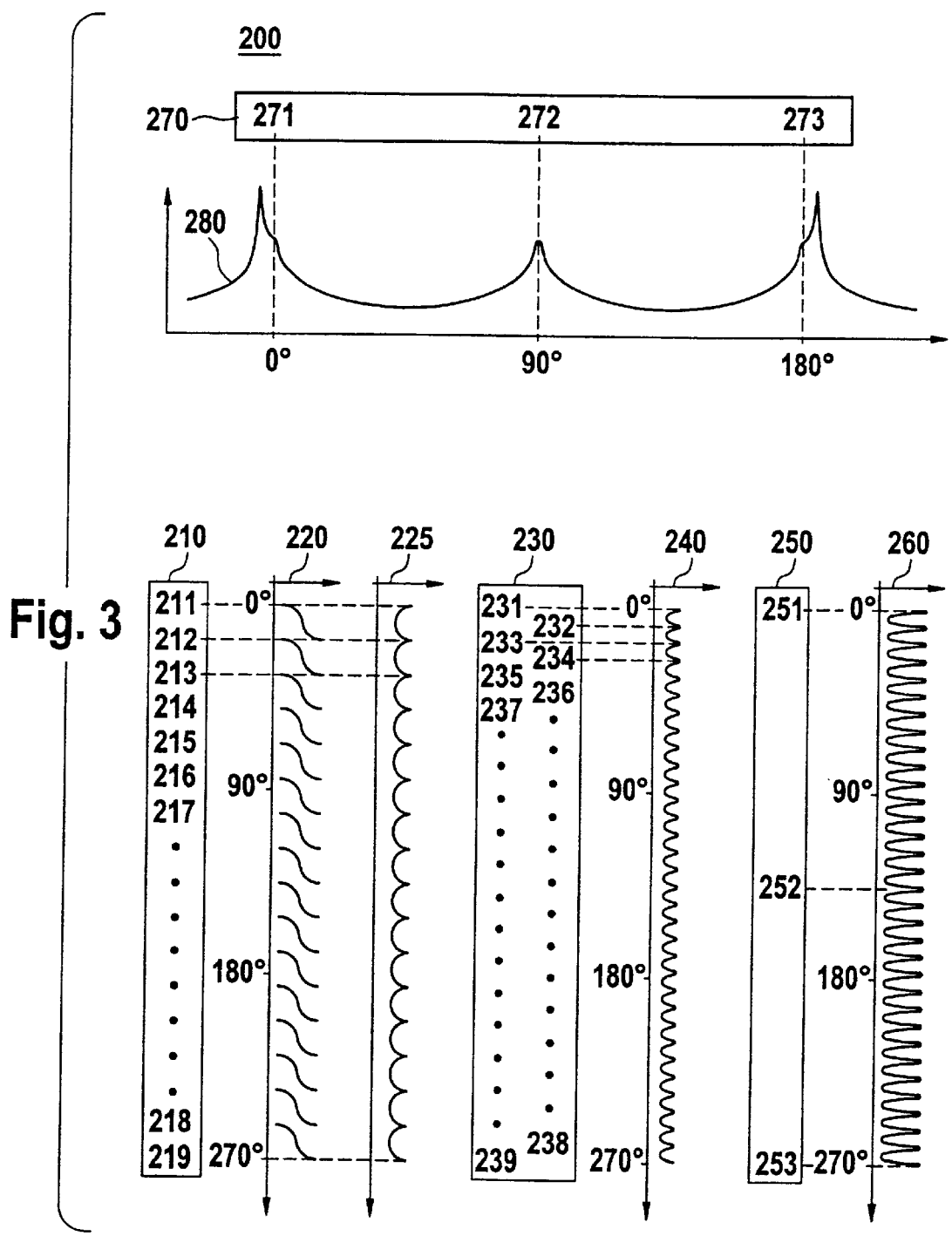

FIG. 1 a block diagram of an operating device having an operating element according to the present invention, FIGS. 1A and 1B alternative embodiments of the operating element, FIG. 2A a coding disk as part of a transformer, FIG. 2B the time characteristic of pulse-shaped signals generated by the transformer as a result of rotation of one of the control elements of the operating element and FIG. 3 an example of a menu having the respective torque characteristics which are imposed on the control elements of the operating element.

DESCRIPTION OF EMBODIMENTS

FIG. 1 shows a schematic diagram of an operating device 100 having an embodiment of an operating element 110 according to the present invention. Operating element 110 includes a first and a second control element 112 and 114, first and second control elements 112 and 114 each being rotatable about their respective axis of rotation. First control element 112 is therefore mounted on a first axle 122, and second control element 114 is mounted on a second axle, the axles being in turn mounted so they can rotate in bearings 126. The axes of rotation of both control elements 112 and 114 thus coincide with the two axles on which they are arranged.

Bearings 126 are designed as simple friction bearings in the present embodiment, but they may also be implemented in the form of ball bearings, roller bearings or comparable bearings in a known manner.

First and second axles 122 and 124, at the same time also being the axes of rotation of first and second control elements 112 and 114, are exactly or at least approximately perpendicular to one another in the embodiment illustrated in FIG. 1. However, a different arrangement of the at least two rotational axes 122 and 124 of the at least two control elements 112 and 114 in relation to one another is fundamentally also possible.

In the embodiment illustrated in FIG. 1, first control element 112 is designed in the form of a sphere, and second control element 114 is designed in the form of a hemisphere partially surrounding first control element 112. In this way, the two control elements form an essentially spherical operating element 110 having a total of two rotational degrees of freedom, with user guidance already being provided due to the assignment of certain areas of operating element 110 (the upper hemisphere and the lower hemisphere 114 in FIG. 1) to different axes of rotation.

The surfaces of both control elements 112 and 114 are structured, each having a ribbing 113 and 115 on its surface in the embodiment illustrated in FIG. 1. This ribbing is oriented in horizontal direction in first control element 112 and vertically in second control element 114. It is used to impart haptic information to the user by way of the possible rotational degree of freedom of the respective control element. In addition, this surface structuring also increases the good grip of respective control element 112 or 114.

According to an advantageous refinement of an operating element 110 according to the present invention, means 150, 160 are provided for influencing the torque required to rotate at least one of control elements 112 and 114. In the present embodiment, they are designed in the form of actuators which can produce, for example, both a passive engagement of one or both control elements 112 and 114 at virtual locating marks produced by influencing means 150 and 160 as a function of the context as well as active jumping of one or both control elements 112 and 114 after deflection from one virtual resting position into the next resting position.

First gear wheels 156 and 166 are arranged on axles 122 and 124, respectively, assigned to both control elements 112 and 114, these gear wheels in turn meshing with other gear wheels 154 and 164 arranged on shafts of a first and a second motor 152 and 162. First and second motors 152 and 162 together with gear wheels 154 and 156, and 164 and 166, respectively, arranged on axles 122 and 124 as well as motor shafts are the actuators or means 150, 160 for influencing the torque required to rotate control elements 112 and 114, respectively.

Operating element 110 described previously together with its two control elements 112 and 114 is part of an operating device 100.

In addition to actual operating element 110, it also includes an analyzer for determining the extent of, in this case, rotation of control elements 112 and 114. Therefore, a first transformer 130 is provided for first control element 112 and a second transformer 140 is provided for second control element 114 to determine the extent and the direction of rotation of respective control element 112 and 114 and to produce a signal indicating the extent and direction of rotation.

Transformers 130 and 140 in the present embodiment each include a pair of photoemitters 135 and 136 arranged side by side in parallel with respective shaft 122 and 124. Arranged opposite photoemitters 135 and 136 is a pair of photodetectors 137 and 138, so that first photoemitter 135 and first photodetector 137 as well as second photoemitter 136 and second photodetector 138 each form a photoelectric barrier. A coding disk 132 and 142, respectively, coupled axially to shafts 122 and 124, respectively, is arranged in the interspace between photoemitters 135, 136 and photodetectors 137, 138 of each transformer 130, 140. Each coding disk 132, 142 is provided with a plurality of radially arranged slots 133, so that a beam of light produced by one photoemitter 135, 136 and directed at corresponding facing photodetector 137, 138 is alternately interrupted or allowed to pass with the rotation of the respective control element and thus the respective coding disk 132, 142.

Each coding disk 132, 142 interrupts in each case two beams of light emitted by photoemitters 137 and 138. The distances between slots 133 in coding disks 132 and 142 in relation to the distance between photoemitters 137 and 138 and photodetectors 135 and 136 is such that when the beam of light of photoemitter 137 is allowed to pass completely through a slot 133, the beam of light emitted by photoemitter 138 is partially blocked.

The interruptions in the beam of light due to a rotation of a coding disk 132 or 142 are detected by photodetectors 135, 136, thus producing signals in the form of pulses.

FIG. 2B shows the time characteristic of these pulse-shaped signals. A first signal 170 is generated by first photodetector 135, and a second signal 171 by second photodetector 136. At time 172 indicated in FIG. 2A, first signal 170 has its maximum intensity corresponding to the full passage of the beam of light of first photoemitter 137, while second signal 171 lags behind the first because the beam of light of second photoemitter 138 is allowed to pass through only partially. The number of pulses is a measure of the rotation of respective coding disk 132 or 142, the sequence or chronological location of the pulses of both signals 170, 171 to one another permitting a determination regarding the direction of rotation of coding disk 132 or 142 and thus of control element 112, 114 assigned accordingly.

It is essential here that the effect described does not occur when the pulses within both signals 170, 171 occur simultaneously or at equal intervals from one another. Then it is no longer possible to detect the direction.

Output signals of transformers 130 and 140 are sent to an analyzer and control circuit 180.

Analyzer and control circuit 180 includes a memory (not shown separately in FIG. 1) in which torque characteristics are stored. They are allocated to the respective control element as a function of the respective context, i.e. a menu called up currently or run through by one of control elements 112 or 114.

FIG. 3 shows as an example such a menu 200 as already known for office applications in widely used computer programs, for example. It includes a one-dimensional menu 270 having contents 271, 272 and 273 presented horizontally on a display instrument (not shown in FIG. 1). In the present example of FIG. 3, for example, the contents of this menu 270 might include selection of a radio transmitter to be received in a radio receiver (271), adjustment of the playback volume of the radio receiver (272) and adjustment of the sound by using a sound equalizer (273) such as that known essentially from radio receiver technology.

Selection of one of the contents 271 through 273 of menu 270 is made by rotating second control element 114, which can rotate about the perpendicular axis of rotation in the plane of the page. The torque imposed on second control element 114 by actuator 160 assigned by controller 180 must be overcome to to rotate second control element 114. To illustrate the resulting locating effects, the figure shows curve 280 of the absolute value of the torque. Notched positions of the second control element at its angles of rotation of 0, 90 and 180 degrees are assigned to selectable contents 271 through 273. A comparatively high torque must be overcome to move the control element or a pointer controlled by control element 114 from one content 271 to 273 within the menu. However, once it has been overcome, the control element automatically jumps to next content 272 of the menu beyond a certain angular position, e.g., at approximately 45 degrees, and then engages there. This is illustrated by the curve labeled 280.

If second control element 114 is rotated beyond an angle of 180 degrees or 0 degrees, depending on whether the direction of rotation is positive or negative, and thus the respective pointer is pushed beyond contents 273 or 271, the torque required to rotate control element 112 increases to a high value, thus giving haptic feedback to the user that he is approaching the end of the current menu. If control element 112 is nevertheless moved further, the pointer can jump from last entry 273 in menu 270 back to first entry 271 or from first entry 271 to last entry 273, depending on the direction of rotation of control element 112.

For example, if item 271 has been selected, i.e., selecting a radio transmitter from a stored list of radio transmitters, for example, the display unit will then show another menu 210, now arranged vertically, having selectable radio transmitters 211, 212, 213, 214, 215, 216, 217, 218 and 219. At the right of this is shown curve 220 of torque 220 required to rotate first control element 112 to run through menu 210. This is in turn characterized in that after deflection of control element 112 from a notched position corresponding to a transmitter 213 in menu 210, for example, control element 112 and the cursor moved by it automatically jump to next adjacent radio transmitter 214 or 212, depending on the direction of rotation, in menu 210 and engage there. Curve 225 of the absolute value of the torque illustrates this once again.

If second list item 272 of menu 270, i.e., the volume setting, has been selected, then another menu 230 is displayed vertically on the display unit, containing a plurality of values 231, 232, 233, 234, 235, 236, 237, 238 and 239 corresponding to volume values. Controller 180 also assigns a torque curve, whose absolute value 240 is plotted over the angular position of second control element 114, to the volume setting. It has a slightly wavy curve over the angular range from 0 to 270 degrees of control element 114 assigned to entire control range 231 to 239, thus resulting in a slight notching effect when passing through the range. The user thus receives haptic feedback regarding the extent of the parameter adjustment, namely a volume adjustment here, made by operating element 110.

Finally, if third item 273 of menu 270, namely the sound setting, has been selected, then in turn a menu 250 which extends vertically is displayed on the display unit by controller 180. It extends from a very bass-heavy sound 251 over a setting 252 representing a balanced, neutral sound to a strongly treble sound 253. Curve 260 assigned to the first control element by controller 180 for adjusting the sound resembles that for the volume adjustment, but it has a distinctly perceptible locating mark in the area of neutral setting 252.

The preceding discussion illustrates the fact that an individual assignment of a certain torque characteristic to one of two control elements 112 or 114 of operating element 110 as a function of a parameter to be adjusted is possible. The absolute value of the torque required to rotate one of the control elements and the distribution of locating marks on the periphery or a revolution of a control element can be predetermined as a function of the context. Thus, for example, it is equally possible to distribute a plurality of volume values and thus locating marks, i.e., a high resolution of the volume with a broad volume range and thus a wide adjustment range over, for example, three-quarters of a revolution of a control element as it is to distribute, for example, just three entries 271 through 273 of menu 270 over half of a revolution of second control element 114.

Likewise, however, it is also possible to assign a smooth torque curve without locating marks or even a constant torque to a certain parameter to be adjusted. In this way, for example, the usual haptics for a traditional volume potentiometer may also be assigned to a volume adjustment for an audio system.

In addition, it is also possible to adjust the torques required to rotate both control elements 112 and 114 of operating element 110 independently of one another. In particular, it is also possible, for example, to completely block one of the two control elements for the case when only a one-dimensional menu is available and thus to give the user haptic feedback indicating that this is only a one-dimensional menu. Thus, for example, in the case of menu 270, first control element 112 can be blocked completely. In this way, the user receives the additional information that menu 270, which is in a one-dimensional form, evidently extends in the horizontal direction but not in the vertical direction. Thus, haptic user guidance is also possible by suitable action on control elements 112 and 114 of operating element 110.

It is also within the scope of the present invention for control elements 112 and 114 of operating element 110 not to be designed essentially spherically or hemispherically in deviation from the illustration in FIG. 110. For example, the control elements may also be designed in the form of a wheel 117 arranged on second axle 124 and a roller arranged on first axle 122, as illustrated in FIG. 1B. Likewise, the control elements of the operating element may also be designed, for example, in the form of an ellipsoid (first control element 118) and a semi-ellipsoid (second control element 119).

What is claimed is:

1. An operating element comprising:
   a first control element rotatable about a first axis; and
   a second control element rotationally symmetrical about an axis of rotational symmetry and rotatable about a second axis that does not coincide with the first axis, wherein the second control element partially encloses the first control element, and the first axis is independent of a position of the second control element;
   wherein the first control element is mounted on a first axle, and the second control element is mounted on a second axle.

2. The operating element of claim 1 wherein the second axis coincides with the axis of rotational symmetry of the second control element.

3. The operating element of claim 1 wherein the first axis is essentially perpendicularly arranged with respect to the second axis.

4. The operating element of claim 1 wherein at least one of the first control element and the second control element includes a surface structuring to improve its grip.

5. The operating element of claim 4, wherein the surface structuring illustrates a rotational direction.

6. The operating element of claim 1 further comprising an arrangement to influence a torque required to rotate at least one of the first control element and the second control element.

7. The operating element of claim 6, wherein the arrangement includes at least one actuator to influence the torque required to rotate the at least one of the first control element and the second control element.

8. The operating element of claim 1 wherein the first control element and the second control element are independently rotatable.

9. The operating element of claim 1 wherein the operating element is characterized by an essentially spherical shape, the first control element is essentially spherical, the second control element is essentially hemispherical, and the first control element is surrounded at least in part.

10. The operating element of claim 1 wherein at least one of the first control element and the second control element includes a surface structuring to illustrates a rotational direction.

11. The operating element of claim 4, 10, or 5, wherein the structuring includes a ribbing.

12. The operating element of claim 11, wherein the first control element includes the ribbing oriented in a first direction, and the second control element includes the ribbing oriented in a second direction.

13. The operating element of claim 12, wherein the first direction and the second direction are perpendicular to one another.

14. The operating element of claim 12, wherein the first direction is horizontal, and the second direction is vertical.

15. An operating element comprising:

a first control element rotatable about a first axis; and a second control element rotationally symmetrical about an axis of rotational symmetry and rotatable about a second axis that does not coincide with the first axis, wherein the second control element partially encloses the first control element, and the first axis is independent of a position of the second control element;

wherein the operating element is characterized by an essentially spherical shape, the first control element is essentially spherical, the second control element is essentially hemispherical, and the first control element is surrounded at least in part.

* * * * *

UNITED STATES PATENT AND TRADEMARK OFFICE
CERTIFICATE OF CORRECTION

PATENT NO.    : 6,742,410 B1                                          Page 1 of 4
DATED         : June 1, 2004
INVENTOR(S)   : Johannes Eschler It is certified that error appears in the above-identified patent and that said Letters Patent is hereby corrected as shown below:

Column 1,
Line 4, change "Background Information" to -- Field of the Invention --
Lines 6-7, change "according to the definition of the species of the independent patent claims." to -- having a first control element and a second control element. --
Lines 9-10, change "computers, operating devices are known which have" to -- computers, an operating device may have --
Line 11, change "the letter preferably in" to -- the letter may be in --
Line 12, change "devices are mostly used" to -- devices may be used --
Line 16, change "in such a known operating device is usually supported" to -- in such an operating device may be supported --
Line 20, change "describes an operating device" to -- refers to an operating device --
Line 22, delete "described there"
Line 24, change "this permits" to -- this may permit --
Line 28, change "The device" to -- The foregoing device --, delete "described here", change "is therefore" to -- may therefore be --
Line 31, change "Finally, one-dimensional" to -- Finally, for one-dimensional --
Line 34, change "are also know. Various" to -- various --
Line 39, change "another known" to -- another --
Line 43, change "Advantages of the Invention" to -- Summary of the Invention --
Line 44, change "The operating element according to" to -- An operating element of an exemplary embodiment of --
Line 45, delete "having...namely"
Line 46, change "an operating element" to -- includes an operating element --
Line 49, change "has the advantage" to -- and is believed to have the advantage --
Line 50, change "This permits," to -- This may permit, --
Line 59, change "An especially advantageous embodiment" to -- In another exemplary embodiment --
Line 60, change "element" to -- element, --
Lines 60-61, delete "according to...fact that"
Line 64, change "This has the advantage" to -- This is believed to have the advantage --

Column 2,
Line 5, change "is especially advantageous" to -- may be especially advantageous --
Line 11, change "It is also advantageous means for influencing" to -- It is also believed to be advantageous an apparatus, arrangement or structure for influencing --
Line 26, change "It is also advantageous" to -- It is also believed to be advantageous --
Line 28, change "according to" to -- of an exemplary embodiment of --
Line 28, change "in contrast with the" to -- in contrast with a --
Line 29, change "mentioned in" to -- of --
Line 31, change "according to" -- of an exemplary embodiment of --

UNITED STATES PATENT AND TRADEMARK OFFICE
CERTIFICATE OF CORRECTION

PATENT NO. : 6,742,410 B1
DATED : June 1, 2004
INVENTOR(S) : Johannes Eschler

It is certified that error appears in the above-identified patent and that said Letters Patent is hereby corrected as shown below:

Column 2, (cont)
Line 44, change "Drawings" to -- Brief Description of the Drawings --
Lines 45-47, delete "Embodiments...They show"
Line 49, change "FIG. 1 a block diagram" to -- FIG. 1 shows a block diagram --
Line 50, change "according to the present invention," to -- of an exemplary embodiment of the present invention. --
Line 51, change "FIGS. 1A and 1B" to -- FIG. 1A shows an --, change "embodiments of" to -- embodiment of --
Line 52, change "element," to -- element. --, insert -- FIG. 1B shows another alternative embodiment of the operating element. --
Line 54, change "FIG. 2B the time" to -- FIG. 2B shows the time --
Line 56, change "operating element, and" to -- operating element. --
Line 57, change " FIG. 3 an" to -- FIG. 3 shows an --, delete "example of a", change "menu" to -- exemplary menu --
Line 62, change " Description of Embodiments" to -- Detailed Description --
Line 65, change "according to" to -- of an exemplary embodiment of --

Column 3,
Line 8, delete "designed as simple"
Line 9, change "the present embodiment" to -- the exemplary embodiment --
Lines 9-10, delete "implemented in the form of"
Line 10, change "or comparable" to -- or other comparable --
Line 11, change "bearings in a known manner." to -- bearings. --
Lines 18-19, change "is fundamentally also possible." to -- may also be used. --
Line 20, change "In the embodiment illustrated in FIG. 1," to -- In the exemplary embodiment of FIG. 1, --
Line 22, change "is designed in the form" to -- is in the form --
Line 40, change "According to an advantageous refinement of an operating" to -- According to another operating --
Line 41, change "according to the present invention" to -- of an exemplary embodiment of the present invention --, change "means 150," to -- apparatuses, arrangements of structures --
Line 43, change "In the present" to -- In the exemplary --
Line 44, change " they are designed in" to -- they are in --
Line 58, change "actuators or means" to -- actuators or apparatuses, arrangements or structures --

UNITED STATES PATENT AND TRADEMARK OFFICE
CERTIFICATE OF CORRECTION

PATENT NO. : 6,742,410 B1
DATED : June 1, 2004
INVENTOR(S) : Johannes Eschler

It is certified that error appears in the above-identified patent and that said Letters Patent is hereby corrected as shown below:

Column 4,
Line 6, change "the present embodiment" to -- the exemplary embodiment --
Line 48, change "It is essential" to -- It may be essential --
Lines 52-53, change "Then it is no longer possible" to -- Then it may no longer be possible --
Lines 61-62, change "FIG. 3 shows as an example such a menu 200 as already known" to -- FIG. 3 shows an exemplary menu 200, which, for example, may be available --
Line 63, change "programs, for example." to -- programs. --

Column 5,
Lines 3-4, change "such as that known essentially from" to -- such as that which is believed to be available essentially from --

Column 6,
Line 6, change "illustrates the fact that" to -- illustrates how --
Line 8, change "element 110 as" to -- element 110 may be --
Line 9, change "adjusted is possible." to -- adjusted. --
Line 14, change "it is equally possible to distribute a plurality" to -- distribution may be of a plurality --
Line 18, change "element as it is to distribute," to -- element, just as a distribution may be of, --
Line 27, delete "it is also possible to adjust"
Line 29, change "element 110 independently" to -- element 110 may be adjusted independently --
Line 30, delete "it is also possible"
Lines 30-31, delete "to completely block"
Line 31, change "control elements for the case" to -- control elements may be blocked for the case --
Line 39, change "guidance is also possible" to -- guidance may be provided --
Line 42, change "It is also within the scope of the present invention for" to -- Also, the --
Line 43, change "element 110 not" to -- element 110 need not --
Lines 44-45, delete "to be designed...FIG. 100."
Line 45, insert -- be like that of FIG. 1 --
Lines 49-50, change "may also be designed," to -- may also be, --

UNITED STATES PATENT AND TRADEMARK OFFICE
CERTIFICATE OF CORRECTION

PATENT NO. : 6,742,410 B1
DATED : June 1, 2004
INVENTOR(S) : Johannes Eschler

It is certified that error appears in the above-identified patent and that said Letters Patent is hereby corrected as shown below:

Column 7,
Line 27, change "to illustrates" to -- to illustrate --

Signed and Sealed this

Twenty-second Day of March, 2005

JON W. DUDAS
*Director of the United States Patent and Trademark Office*